US009940286B2

(12) United States Patent
Duluk, Jr. et al.

(10) Patent No.: US 9,940,286 B2
(45) Date of Patent: Apr. 10, 2018

(54) PCIE TRAFFIC TRACKING HARDWARE IN A UNIFIED VIRTUAL MEMORY SYSTEM

(71) Applicant: NVIDIA CORPORATION, Santa Clara, CA (US)

(72) Inventors: Jerome F. Duluk, Jr., Palo Alto, CA (US); Cameron Buschardt, Round Rock, TX (US); James Leroy Deming, Madison, AL (US); Brian Fahs, Los Altos, CA (US); Mark Hairgrove, San Jose, CA (US); John Mashey, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 674 days.

(21) Appl. No.: 14/101,246

(22) Filed: Dec. 9, 2013

(65) Prior Publication Data

US 2014/0281110 A1   Sep. 18, 2014
US 2017/0371822 A9   Dec. 28, 2017

Related U.S. Application Data

(60) Provisional application No. 61/785,641, filed on Mar. 14, 2013, provisional application No. 61/800,004, filed on Mar. 15, 2013.

(51) Int. Cl.
*G06F 3/00* (2006.01)
*G06F 13/40* (2006.01)
(Continued)

(52) U.S. Cl.
CPC .......... *G06F 13/404* (2013.01); *G06F 12/123* (2013.01); *G06F 12/0806* (2013.01);
(Continued)

(58) Field of Classification Search
None
See application file for complete search history.

(56) References Cited

U.S. PATENT DOCUMENTS 6,073,225 A * 6/2000 James ................... G06F 11/349
                                                        711/148
6,766,424 B1 * 7/2004 Wilson ................ G06F 12/0813
                                                        711/148
(Continued)

*Primary Examiner* — Idriss N Alrobaye
*Assistant Examiner* — Richard B Franklin
(74) *Attorney, Agent, or Firm* — Artegis Law Group, LLP

(57) ABSTRACT

Techniques are disclosed for tracking memory page accesses in a unified virtual memory system. An access tracking unit detects a memory page access generated by a first processor for accessing a memory page in a memory system of a second processor. The access tracking unit determines whether a cache memory includes an entry for the memory page. If so, then the access tracking unit increments an associated access counter. Otherwise, the access tracking unit attempts to find an unused entry in the cache memory that is available for allocation. If so, then the access tracking unit associates the second entry with the memory page, and sets an access counter associated with the second entry to an initial value. Otherwise, the access tracking unit selects a valid entry in the cache memory; clears an associated valid bit; associates the entry with the memory page; and initializes an associated access counter.

20 Claims, 6 Drawing Sheets

(51) Int. Cl.
  *G06F 12/123*  (2016.01)
  *G06F 12/0864*  (2016.01)
  *G06F 12/0806*  (2016.01)
  *G06F 12/0875*  (2016.01)
(52) U.S. Cl.
  CPC ...... *G06F 12/0864* (2013.01); *G06F 12/0875* (2013.01); *G06F 2212/1016* (2013.01); *G06F 2212/1041* (2013.01)

(56) References Cited

U.S. PATENT DOCUMENTS 7,711,902 B2 *  5/2010  Pong .................. G06F 12/0846
                                                    711/122
9,304,811 B2 *  4/2016  Yao ....................... G06F 9/4856

\* cited by examiner

| Page Number 330 | Valid Bit 340 | Reference Count 350 |
|---|---|---|
| 0x0000_0560 | 1 | 1 |
| 0xD00F_FF00 | 1 | 3 |
| 0x1234_0000 | 1 | 5 |
| 0xBCAE_0F00 | 1 | 1 |
| 0x0020_CD45 | 0 | n/a |
| 0x0000_0000 | 0 | n/a |

Figure 3

PCIE TRAFFIC TRACKING HARDWARE IN A UNIFIED VIRTUAL MEMORY SYSTEM

CROSS-REFERENCE TO RELATED APPLICATIONS

This application claims the benefit of United States provisional patent application entitled "PCIE TRAFFIC TRACKING HARDWARE IN A UNIFIED VIRTUAL MEMORY SYSTEM," Ser. No. 61/785,641, filed Mar. 14, 2013, and of United States provisional patent application entitled "CPU-TO-GPU AND GPU-TO-GPU ATOMICS," Ser. No. 61/800,004, filed Mar. 15, 2013, both of which are hereby incorporated herein by reference.

BACKGROUND OF THE INVENTION

Field of the Invention

Embodiments of the present invention relate generally to computer science and, more specifically, to PCIe traffic tracking hardware in a unified virtual memory system.

Description of the Related Art

Multiprocessor systems typically include one or more shared memory spaces where two or more processers store and load data to and from a common set of memory pages. In such multiprocessor systems, a first processor may access shared memory pages over a communications path, where the shared memory pages are mapped to a local memory of a second processor. The second processor may map the shared memory pages to a local memory space, such that the second processor accesses the shared memory with relatively low latency. The first processor accesses this shared memory over the communications path with relatively high latency as compared with the second processor. Mapping shared memory pages in this fashion may provide efficient shared memory access if the second processor accesses such shared memory pages more often, on average, than the first processor.

If, on the other hand, the first processor accesses certain shared memory pages more often than the second processor, then shared memory access time may be improved by migrating such pages from the local memory space of the second processor to the local memory space of the first processor. These pages may be identified by invalidating all page table entries associated with the first processor's shared memory page addresses for a specified measurement interval. During the measurement interval, page faults resulting from accesses by the first processor to shared memory are counted. At the end of the interval, shared memory pages accessed with relatively high frequency by the first processor may be migrated from the local memory of the second processor to the local memory of the first processor. After these pages are migrated, the first processor may access the migrated shared memory pages with lower latency as compared with accessing the pages over the communications path.

One drawback of this approach is that performance of first processor is reduced during the measurement interval. This reduction in performance results from the computing time needed to service the resulting page faults. Such reductions in performance to service page faults decreases the performance advantage of migrating the shared memory pages in the first instance.

Accordingly, what is needed in the art is a more effective way to identify frequent shared memory page accesses in a multiprocessor system.

SUMMARY OF THE INVENTION

One embodiment of the present invention sets forth a method for tracking memory page accesses in a unified virtual memory system. The method includes detecting a memory page access generated by a first processor for accessing a memory page in a memory system that is associated with a second processor. The method further includes determining whether a cache memory associated with the first processor includes a first entry corresponding to an address associated with the memory page. If the cache memory includes the first entry, then the method further includes incrementing an access counter associated with the first entry that counts accesses of the memory page. If the cache memory does not include the first entry, then the method further includes attempting to find a second entry in the cache memory that is available for allocation. If a second entry in the cache memory is available for allocation; then the method further includes associating the second entry with the memory page; and setting an access counter associated with the second entry to an initial value. If a second entry in the cache memory is not available for allocation; then the method further includes selecting a valid entry in the cache memory; clearing a valid bit included in the selected entry; associating the selected entry with the memory page; and setting an access counter associated with the selected entry to an initial value.

Other embodiments include, without limitation, a subsystem including an access tracking unit that implements one or more aspects of the disclosed methods, and a computing device configured to implement one or more aspects of the disclosed methods.

One advantage of the disclosed approach is that shared memory pages that are candidates for migrating from one memory space to another are quickly and efficiently identified without inducing page faults for each shared memory accesses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates an access cache memory as maintained by the access tracking unit of FIG. 2, according to one embodiment of the present invention.

DETAILED DESCRIPTION

Figure 1:
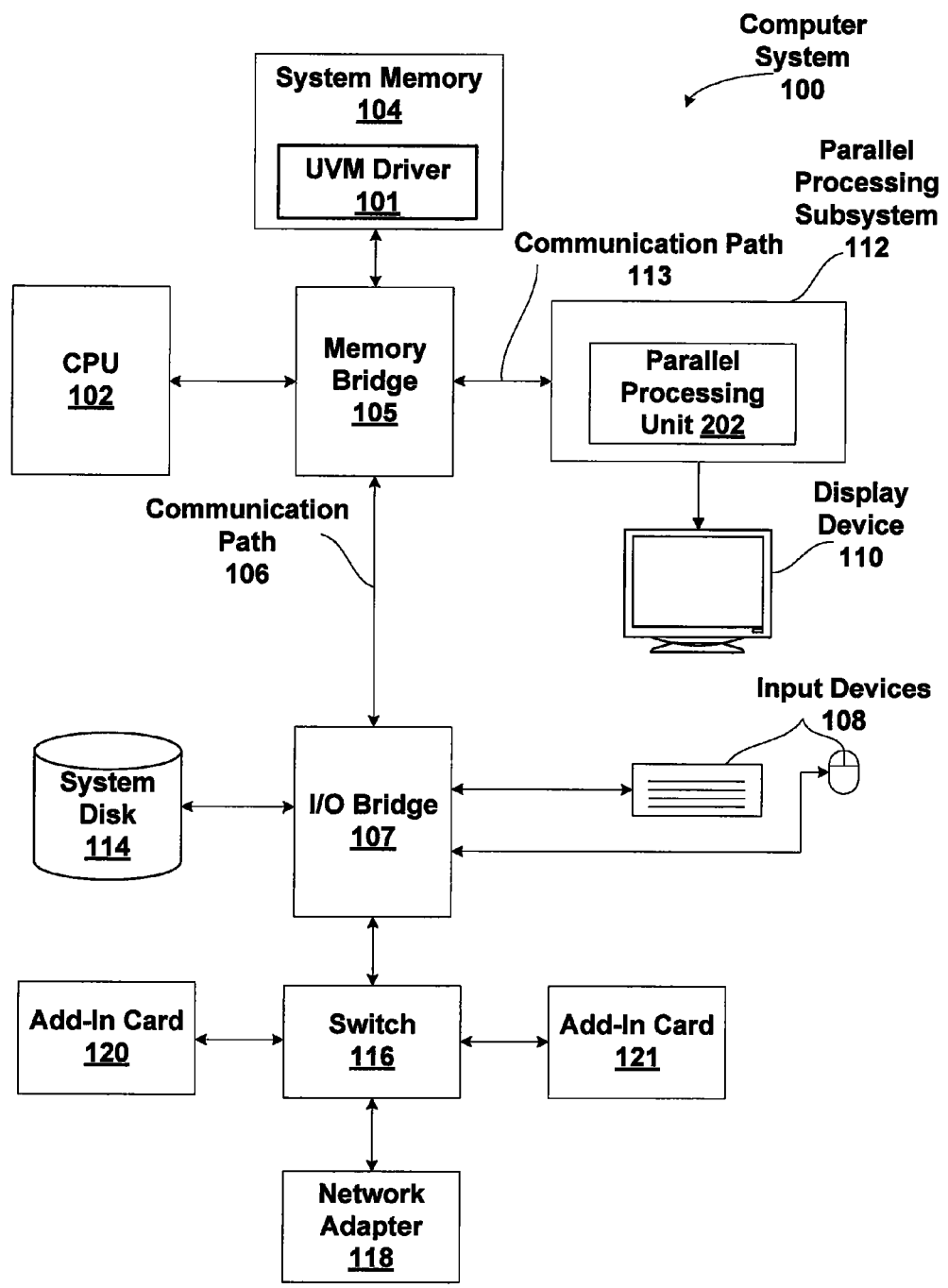
FIG. 1 is a block diagram illustrating a computer system configured to implement one or more aspects of the present invention.

In the following description, numerous specific details are set forth to provide a more thorough understanding of the present invention. However, it will be apparent to one of skill in the art that the present invention may be practiced without one or more of these specific details.

Memory pages in a memory system that are shared between a first processor and a second processor may reside in the memory space of one of the two processors. One of the processors may be a central processing unit (CPU) while the other processor may be a parallel processing unit (PPU), such as a graphics processing unit (GPU). For example, a shared memory page may reside in the CPU memory system, even though both the CPU and the GPU access the memory page. Typically, CPU accesses of such a shared memory page have relatively low access times, while GPU accesses of a CPU-shared memory page may have relatively higher access times. If the GPU frequently accesses such a shared memory page, then GPU performance may be reduced. On the other hand, GPU accesses of GPU-owned memory pages typically have relatively low access times. As a result, performance may be improved if CPU-shared memory pages that are accessed relatively frequently by the GPU are migrated to the GPU memory system.

The access tracker described herein includes a cache memory that includes a quantity of cache entries, where each cache entry includes a count of the number of times a first processor (such as a GPU) accesses a particular memory page or group of memory pages, such as a shared memory page, or group of memory pages, stored in the CPU memory system. For example, if the cache memory includes sixteen entries, then the access tracker can count the accesses for up to sixteen different memory pages, or sixteen different groups of memory pages. Entries in the access tracker may be allocated dynamically as new pages are accessed by the CPU. A CPU-shared memory page associated with a cache entry that has a high access count may be a good candidate for migration from the CPU memory system to the GPU memory system. By contrast, a CPU-shared memory page associated with a cache entry that has a low access count may remain in the CPU memory system.

In some embodiments, the access tracker may receive commands to read the cache entries and invalidate all cache entries in the cache memory. If an access is detected to a new memory page, and all cache entries in the cache memory are already allocated, then the access tracker may invalidate a cache entry, and allocate the cache entry for the new memory page. For example, the access tracker could invalidate the cache entry with the lowest counter value.

In addition, the cache tracker may include a threshold value, where the access tracker indicates when a counter has reached the threshold value, such as by setting a flag or causing a trap or interrupt to occur. When a counter reaches a threshold value, the associated memory page is being frequently accessed by the GPU. The CPU or the GPU may respond by migrating the associated memory page from the CPU memory system to the GPU memory system. Cache entries may be preset, allowing the access tracker to monitor specific predefined memory pages. In some embodiments, the access tracker may maintain a list of barred memory pages that may not be allocated to a cache entry.

System Overview

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol (s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on.

Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
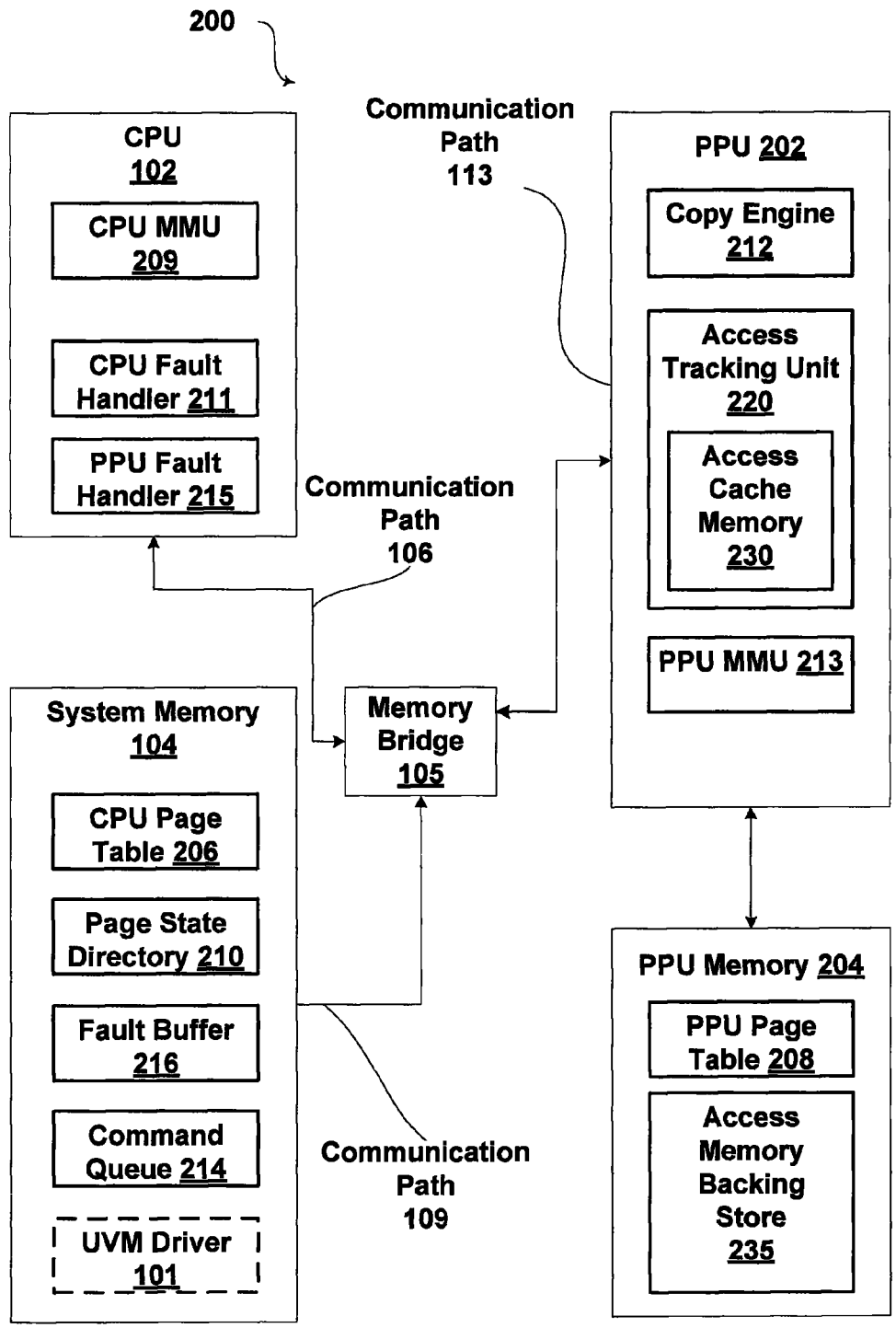
FIG. 2 is a block diagram illustrating a unified virtual memory (UVM) system, according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being invoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:
(a) on the CPU 102 access to an unmapped page that is mapped to the PPU 202, that has not been recently migrated, unmap the faulting page from the PPU 202, migrate the page to the CPU 102, and map the page to the CPU 102;
(b) on the PPU 202 access to an unmapped page that is mapped to the CPU 102, that has not been recently migrated, unmap the faulting page from the CPU 102, migrate the page to the PPU 202, and map the page to the PPU 202;
(c) on the CPU 102 access to an unmapped page that is mapped to the PPU 202, that has been recently migrated, migrate the faulting page to the CPU 102 and map the page on both the CPU 102 and the PPU 202;
(d) on the PPU 102 access to an unmapped page that is mapped on the CPU 102, that has been recently migrated, map the page to both the CPU 102 and the PPU 202;
(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;
(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;
(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.
(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and
(i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence.

Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Traffic Tracking Hardware in a UVM System

As also shown in FIG. 2, the PPU 202 includes an access tracking unit 220, which includes an optional access cache memory 230. This optional access cache memory 230 is a cached portion of a larger access memory backing store 235 which may reside in PPU memory 204. Alternatively, the access cache memory backing store 235 may reside in system memory 104.

The access tracking unit 220 tracks access operations to various shared memory pages by the PPU 202 over communications path 113. Shared memory pages residing in system memory 104 that are accessed often by the PPU 202 may be candidates for migration from system memory 104 to PPU memory 204. The access tracking unit 220 monitors communications path 113 for memory access operations issued by the PPU 202 that are directed to shared memory pages residing in system memory 104. When the access tracking unit 220 detects such a memory access operation, the access tracking unit 220 extracts the page number of the memory access operation, where the page number typically includes the leftmost bits of the memory address associated with the memory access operation. The access tracking unit 220 records the page numbers associated with such memory access operations with a reference count that indicates the number of times each shared memory page was accessed by the PPU 202. The access tracking unit 220 stores these page numbers, along with related information, in the access cache memory 230, as further described herein.

The access cache memory 230 includes tracking information associated with memory access operations to various shared memory pages by the PPU 202 over communications path 113.

The access memory backing store 235 likewise includes tracking information associated with memory access operations to various shared memory pages by the PPU 202 over communications path 113. In cases, where the UVM system 200 includes both an access cache memory 230 and an access memory backing store 235, the access cache memory 230 includes a cached subset of the tracking entries in the access memory backing store 235. In cases where the UVM system 200 includes only an access memory backing store 235 with no access cache memory 230, the operations described herein are performed directly on the entries in the access memory backing store 235, rather than the entries in the access cache memory 230.

Two operating system operations (OS operations) may be provided in association with the access tracking unit 220. The first OS operation is an initialize command that causes the access tracking unit 220 to initialize the access cache memory 230 by clearing the valid bits for all cache access entries in the access cache memory 230. The initialize command may also include a limit value as further described herein. Clearing the access cache memory 230 also clears the optional access memory backing store 235.

The second OS operation is a read count values command that causes the access tracking unit 220 to transmit the contents of the valid access cache entries in the access cache memory 230 to the requester. Alternatively, the access tracking unit 220 transmits the contents of all access cache entries in the access cache memory 230 to the requester. For example, if the access cache memory 230 includes sixteen entries, where each entry includes eight bytes per entry, then the returned data would be 128 bytes of data. The transmitted access cache entries include accumulated tracking data from the access cache memory 230 since the most recent initialize command. The optimal number of cache access entries in the access cache memory 230 may be determined empirically. The initialize command and the read count values command may be combined into one command that performs the following operations for each count value: (1) read the count value; (2) transmit the count value; and (3) clear the count value.

If the access tracking unit 220 detects a memory access operation from the PPU 202 directed to a shared memory page in system memory 104, then the access tracking unit 220 determines whether the access cache memory 230 includes a valid access cache entry corresponding to the accessed memory page. If a valid entry exists for the accessed memory page, then the access tracking unit 220 increments the reference count in the access cache entry. If a valid entry does not exist for the accessed memory page, then the access tracking unit 220 selects an unused cache access entry, and stores the page number in the unused entry. The access tracking unit the initializes the reference count for the unused cache access entry and sets the corresponding valid bit.

Access cache entries associated with high reference counts may be candidates for migration from system memory 104 to PPU memory 204. The access cache memory 230 may be fully associative. In one example, the access cache memory 230 could be implemented as a content-addressable memory (CAM), such that a cache access entry with the lowest reference count could be easily identified. If the access tracking unit 220 determines that no unused cache entries are available, the access tracking unit 220 may invalidate, or evict, the cache access entry with the lowest reference count. Such an approach approximates a "most-frequently-used" eviction policy for the cache access memory 230. Alternatively, cache access entries may be evicted using any technically feasible approach. Further, the access cache memory 230 may be set associative, such as is typically used in association with TLB applications.

In one embodiment, the access tracking unit 220 includes a writable limit register and a total-accesses counter (not shown). The access tracking unit 220 increments the total-accesses counter each time the PPU 202 accesses any shared memory page residing in system memory 104. When the total-accesses counter reaches the value stored in the limit registers, the access tracking unit 220 causes a trap or interrupt to the operating system. The UVM driver 101 may then issue a read count values command to retrieve the contents of the access cache memory 230. The UVM driver 101 may subsequently issue an initialize command to cause the access tracking unit 220 to start another tracking interval. The value in the limit register may be set via a parameter included with the initialize command.

In one embodiment, the UVM driver 101 may preset any number of cache access entries in the cache access memory 230. In this embodiment, the access tracking unit may be prevented from tracking accesses to shared memory pages that are accessed frequently by both the CPU 102 and the PPU 202, and, as such, may not be candidates for migration from system memory 102 to PPU memory 204.

In another alternative embodiment, the access tracking unit 220 may access or maintain a list of page numbers that are barred from tracking. In this embodiment, when the access tracking unit 220 detects an access by the PPU 202 to a shared memory page residing in system memory 104, the access tracking unit 220 first compares the page number for the current operation with the list of pages barred from tracking. If the currently accessed shared memory page corresponds to a page number in the list of barred memory pages, then the access tracking unit 220 does not store tracking data for the current shared memory access operation in the access cache memory 230. This alternative approach may likewise prevent the access tracking unit 220 from tracking accesses to shared memory pages that are accessed frequently by both the CPU 102 and the PPU 202, and, as such, may not be candidates for migration from system memory 102 to PPU memory 204.

FIG. 3 illustrates an access cache memory 300 as maintained by the access tracking unit 220 of FIG. 2, according to one embodiment of the present invention. The access cache memory 300 functions substantially the same as the access cache memory 230 described in conjunction with FIG. 2 except as further described below. As shown, the access cache memory includes access cache entries 320, each access cache entry including several fields as identified by the field identifiers 310.

The field identifiers 310 indicate that each access cache memory entry 320 includes a page number field 330, a valid bit field 340, and a reference count field 350.

The page number field 330 is associated with the memory address of the first location of the corresponding shared memory page. Typically, the page number is the leftmost portion of the memory address specified by the memory access operation. For example, if memory addresses directed to shared memory are 48-bits wide and each shared memory page is $2^{16}$ or 64 k bytes long, then the page number would be the leftmost 32 bits of the memory address. In another example, if a shared memory address includes 40 bits, and the page size is 4 kB (12 bits of address space), then the page frame would include 40−12=28 bits. In yet another example, if a physical address includes 42 bits, and the page size is 4 kB (12 bits of address space), then the page number would include 42−12=30 bits.

In some embodiments, each page number field 330 may be associated with the memory address of the first location of a group of corresponding shared memory pages. For example, if memory addresses directed to shared memory are 48-bits wide, each shared memory page is $2^{16}$ or 64 k bytes long, and each group of shared memory pages includes $2^4$ or 16 pages, then the page number field 330 would be 48−16−4=28 bits. Having each page number field 330 associated with a group of shared memory pages, rather than a single memory page, may reduce the number of access cache memory entries 320, thereby reducing the hardware needed. In such cases, groups of pages are identified for migration, rather than individual memory pages.

The valid bit field 340 is a single bit that is clear, or zero, if the corresponding access cache entry 320 is invalid. The valid bit field 340 is set, or one, if the corresponding access cache entry 320 is valid. If an access cache entry 320 is valid, then the page number field 330 includes a page number that has been tracked by the access tracking unit 220 since the most recent initialize command. Likewise, if an access cache entry 320 is valid, then the reference count field 330 indicates the number of times the corresponding page number has been accessed since the list initialize command.

The reference count field 350 includes a count of the number of times corresponding page number has been accessed since the last initialize command. The reference count is typically initialized to zero. However, the reference count may be initialized to any arbitrary value. Each time the corresponding page is accessed, the reference count is incremented. In some embodiments, the reference count field 350 may be associated with a saturating counter (not shown) within the access tracking unit 220. In such cases, the reference count field 350 is incremented only if the current reference count is less than or equal to a maximum, or saturation, value.

As shown, the access cache memory 300 includes N access cache entries numbered from access cache entry 320(0) through access cache entry 320(N−1). Access cache entry 320(0) is a valid cache entry, as indicated by the '1' in the valid bit field 340. The access cache entry 320(0) is associated with page number 0x0000_0560 and has been accessed once since the most recent initialize command, as indicated by the page number field 330 and the reference count field 350, respectively.

Likewise, access cache entry 320(1) is a valid cache entry, as indicated by the '1' in the valid bit field 340. The access cache entry 320(1) is associated with page number 0xD00F_FF00 and has been accessed three times since the most recent initialize command, as indicated by the page number field 330 and the reference count field 350, respectively. Access cache entry 320(2) is a valid cache entry, as indicated by the '1' in the valid bit field 340. The access cache entry 320(2) is associated with page number 0x1234_0000 and has been accessed five times since the most recent initialize command, as indicated by the page number field 330 and the reference count field 350, respectively. Access cache entry 320(3) is a valid cache entry, as indicated by the '1' in the valid bit field 340. The access cache entry 320(3) is associated with page number 0xBCAE_0F00 and has been accessed once since the most recent initialize command, as indicated by the page number field 330 and the reference count field 350, respectively Access cache entries 320(4) 320(N−1) are invalid cache entries, as indicated by the '0' in the valid bit field 340. Accordingly, the page number field 330 and the reference count field 350 for access cache entries 320(4) 320(N−1) do not contain valid information.

In some embodiments, the valid bit field 340 and the reference count field 350 may be combined into a single field (not shown). In such embodiments, the combined field may be set to zero to indicate that the corresponding access cache entry 320 is invalid. Any non-zero value indicates that the corresponding access cache entry 320 is valid and specifies the number of times that the corresponding page, as referenced by the page number fields 330, has been accessed since the most recent initialize command.

Figure 4A:
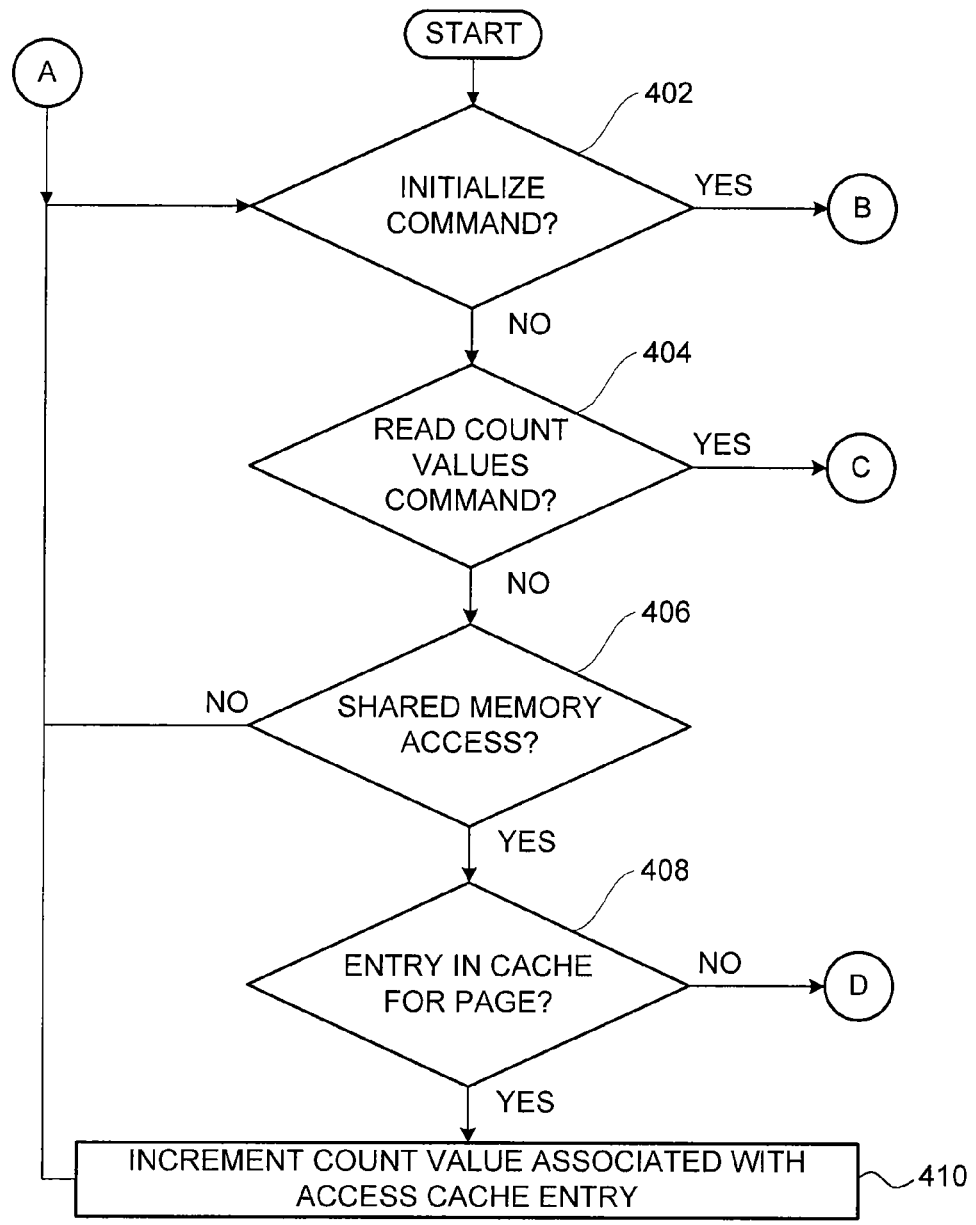
FIGS. 4A-4C set forth a flow diagram of method steps for tracking memory page accesses in a unified virtual memory system, according to one embodiment of the present invention.
Figure 4B:
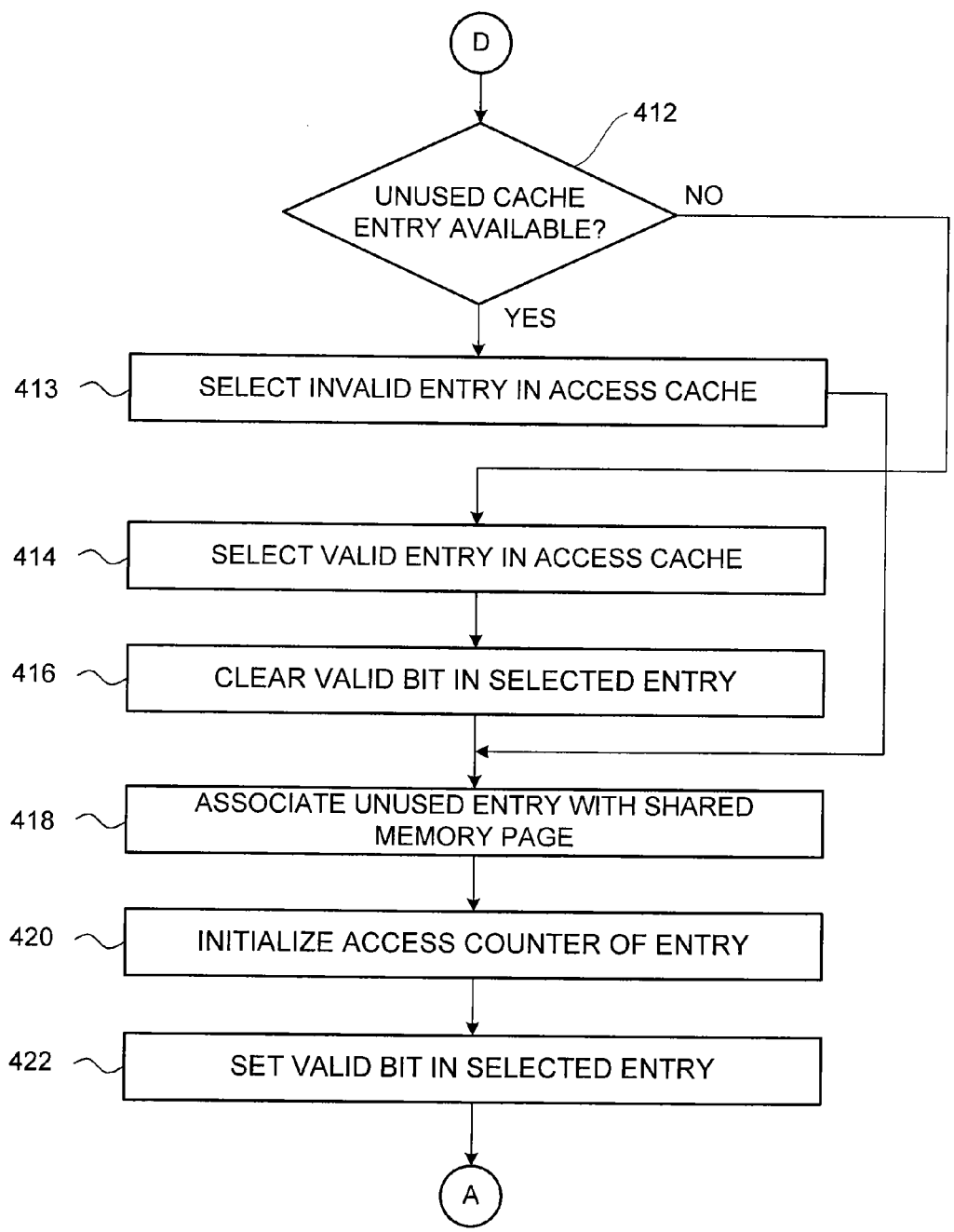
Figure 4C:
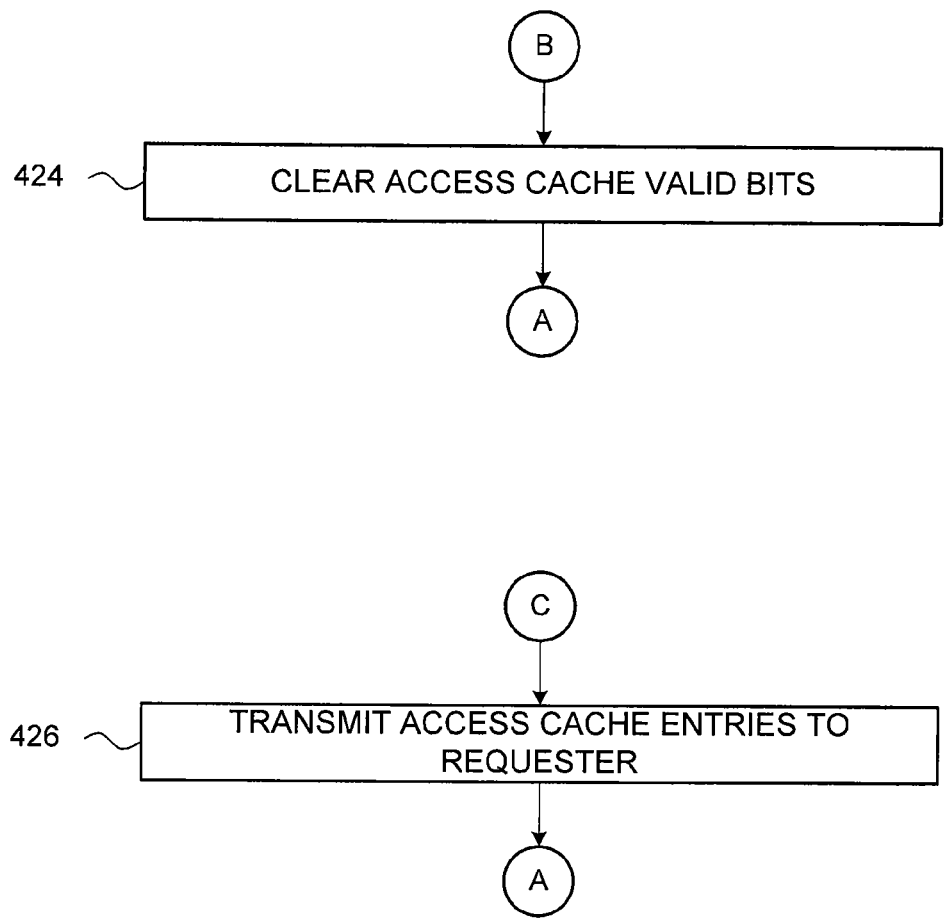

FIGS. 4A-4C set forth a flow diagram of method steps for tracking memory page accesses in a unified virtual memory system, according to one embodiment of the present invention. Although the method steps are described in conjunction with the systems of FIGS. 1-3, persons of ordinary skill in the art will understand that any system configured to perform the method steps, in any order, is within the scope of the invention.

As shown, a method 400 begins at step 402, where the access tracking unit 220 determines whether an initialize command has been received. If an initialize command has not been received, then the method 400 proceeds to step 404, where the access tracking unit 220 determines whether a read count values command has been received. If a read count values command has not been received, then the method 400 proceeds to step 406, where the access tracking unit 220 determines whether a shared memory access operation has issued from the first processor over the communications path 113.

If a shared memory access operation has issued from the first processor over the communications path 113, then the method 400 proceeds to step 408, where the access tracking unit 220 determines whether the access cache memory 230 includes a valid access cache entry for the accessed memory page. If the access cache memory 230 includes a valid access cache entry for the accessed memory page, then the method 400 proceeds to step 410, where the access tracking unit 220 increments the reference count value associated with the access cache entry. In some embodiments, the access tracking unit 220 may increment the reference count value only if the reference count value is less than a maximum, or saturation, value. The method 400 then proceeds to step 402, described above.

Returning to step 408, if the access cache memory 230 does not include a valid access cache entry for the accessed memory page, then the method 400 proceeds to step 412, where the access tracking unit 220 determines whether the access cache memory 230 includes an unused access cache entry. An unused access cache entry may be indicated by an access cache entry with a cleared valid bit. If the access cache memory 230 does not include an unused access cache entry, then the method 400 proceeds to step 414, where the access tracking unit 220 selects a valid cache entry in the access cache memory 230 to evict. The valid access cache entry may be selected using any technically feasible method, including, without limitation, an access cache entry with the lowest reference count, a randomly selected access cache entry, or an access cache entry selected on a round robin basis. Alternatively, the access tracking unit 220 may evict no access cache entries. In this latter case, accesses to the memory page corresponding to the current memory access operation are not tracked.

At step 416, the access tracking unit 220 clears the valid bit of the selected access cache entry. At step 418, the access tracking unit 220 associates the selected access cache entry with the page number of the current shared memory access operation. In so doing, the access tracking unit 220 stores the page number corresponding to the current memory access operation in the page number field of the selected access cache entry. At step 420, the access tracking unit 220 initializes the reference count field of the selected cache entry. The reference count field may be initialized to zero or to any other technically feasible value. At step 422, the access tracking unit 220 sets the valid bit of the selected access cache entry. The method 400 then proceeds to step 402, described above.

Returning to step 412, if the access cache memory 230 includes an unused access cache entry, then the method 400 proceeds to step 413, where the access tracking unit 220 selects an invalid cache entry in the access cache memory 230. As described herein, an invalid cache entry is a cache entry with a cleared valid bit. Such a cache entry may be considered unused and available for allocation. The method 400 then proceeds to step 418, described above.

Returning now to step 406, if a shared memory access operation has not issued from the first processor over the communications path 113, then the method 400 proceeds to step 402, described above.

Returning now to step 404, if a read count values command has been received, then the method 400 proceeds to step 426, where the access tracking unit 220 transmits the access cache entries in the access cache memory 230 to the requester. The method 400 then proceeds to step 402, described above.

Returning now to step 402, if an initialize command has been received, then the method 400 proceeds to step 424, where the access tracking unit 220 clears the valid bit for each access cache entry in the access cache memory 230. The method 400 then proceeds to step 402, described above.

In sum, an access tracking unit monitors access operations generated by a first processor, where the memory access operations are directed to a shared memory in the local memory space of a second processor. The memory access operations monitored by the access tracking unit are typically performed via a communications path, such as a PCIe bus, that connectively couples the first processor and the second processor. The access tracking unit maintains an access cache memory. Each entry of the access cache memory includes a page number, a valid bit, and a saturating reference count. The access cache memory may be initialized by an operating system command that clears all the valid bits. When the first processor accesses shared memory over the communications path, the access tracking unit stores the page number corresponding to the shared memory access in an unused access cache entry, sets the valid bit of the entry, and initializes the reference count. Later accesses to the same shared memory page cause the reference count to increment. Accesses to different pages are stored in other entries of the access cache memory. After a measurement period, an operating system may read the contents of the access cache memory. Shared memory pages associated with access cache entries with a high reference count may be candidates for migration from the local memory of the second processor to the local memory of the first processor.

One advantage of the present invention is that shared memory pages that are candidates for migrating from one memory space to another are quickly and efficiently identified. The access tracking unit identifies these candidate pages by monitoring shared memory accesses over a communications path. This approach does not disrupt ongoing shared memory accesses, as compared with other approaches that induce page faults for each shared memory accesses. Shared memory performance is improved after such candidate pages are migrated, because the first processor can access the candidate pages over low latency local memory rather than remotely over a communications path.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for tracking memory page accesses in a unified virtual memory system, the method comprising:
    based on determining that a set of memory pages is accessed by a first processor and a second processor, barring the set of memory pages from being tracked by access counters;
    detecting a memory page access generated by the first processor for accessing a memory page, wherein the memory page resides in a memory system that is associated with the second processor;
    determining that the memory page is not included in the set of memory pages that are barred from being tracked by the access counters;
    determining whether a cache memory associated with the first processor includes a first entry corresponding to an address associated with the memory page; and
    if the cache memory includes the first entry, then:
        incrementing an access counter associated with the first entry that counts accesses of the memory page; or
    if the cache memory does not include the first entry, then:
        initializing a second entry in the cache memory to correspond to the memory page.

2. The method of claim 1, wherein initializing a second entry in the cache memory to correspond to the memory page comprises:
    determining whether an unused entry in the cache memory is available for allocation; and
    if an unused entry in the cache memory is available for allocation; then
        assigning the unused entry as the second entry;
        associating the second entry with the memory page; and
        setting an access counter associated with the second entry to an initial value; or
    if an unused in the cache memory is not available for allocation; then
        selecting a valid entry in the cache memory;
        assigning the valid entry as the second entry;
        clearing a valid bit included in the second entry;
        associating the second entry with the memory page; and
        setting an access counter associated with the second entry to an initial value.

3. The method of claim 2, wherein determining whether an unused entry in the cache memory is available for allocation comprises determining whether a valid bit included in the second entry has been cleared.

4. The method of claim 2, wherein associating the second entry with the memory page comprises:
    storing a page number associated with the memory page in the second entry; and
    setting a valid bit included in the second entry.

5. The method of claim 2 wherein selecting a valid entry in the cache memory comprises selecting from a set of all valid entries the entry having an access counter with the lowest value relative to the values of all other access counters associated with all other valid entries.

6. The method of claim 1, further comprising:
    receiving a command to initialize the cache memory; and
    for each valid entry in the cache memory, clearing a valid bit included in the entry.

7. The method of claim 1, further comprising:
    receiving a command from at least one of the first processor and the second processor to read the access counters associated with one or more cache entries; and
    transmitting data stored in one or more entries of the cache memory to the at least one of the first processor and the second processor.

8. The method of claim 1, further comprising:
    comparing the access counter associated with the first entry to a threshold value; and
    indicating that the access counter is equal to the threshold value;
    wherein the threshold value is based on a quantity of accesses that identifies the memory page as a candidate for migration to a memory system that is associated with the first processor.

9. The method of claim 1, further comprising:
receiving a command to preset a third entry in the cache memory, wherein the command includes at least a portion of a second address;
storing the at least a portion of the second address in the third entry; and
setting a valid bit included in the third entry.

10. The method of claim 1, wherein determining that the memory page is not included in a set of memory pages that are barred from being tracked by access counters comprises, after determining that the cache memory does not include the first entry, determining that a reference to the memory page does not appear on a list of physical memory pages that are barred from being added to the cache memory.

11. The method of claim 1, wherein the first processor comprises a graphics processing unit, and the second processor comprises a central processing unit.

12. The method of claim 1, wherein a bus coupling the first processor to the second processor comprises a peripheral component interconnect express (PCIe) bus.

13. The method of claim 1, wherein the cache memory comprises a set associative memory.

14. A computer-implemented method for tracking memory page accesses in a unified virtual memory system, the method comprising:
detecting a memory page access generated by a first processor for accessing a memory page in a memory system that is associated with a second processor;
determining whether a cache memory associated with the first processor includes a first entry corresponding to an address associated with the memory page;
if the cache memory includes the first entry, then:
incrementing an access counter associated with the first entry that counts accesses of the memory page; or
if the cache memory does not include the first entry, then:
initializing a second entry in the cache memory to correspond to the memory page;
comparing the access counter associated with the first entry to a threshold value; and
indicating that the access counter is equal to the threshold value, wherein the threshold value is based on a quantity of accesses that identifies the memory page as a candidate for migration to a memory system that is associated with the first processor, wherein indicating that the access counter is equal to the threshold value comprises setting a flag associated with the first entry, and wherein either the first processor or the second processor identifies the memory page as a candidate for migration to a memory system that is associated with the first processor based on the flag.

15. A computer-implemented method for tracking memory page accesses in a unified virtual memory system, the method comprising:
detecting a memory page access generated by a first processor for accessing a memory page in a memory system that is associated with a second processor;
determining whether a cache memory associated with the first processor includes a first entry corresponding to an address associated with the memory page;
if the cache memory includes the first entry, then:
incrementing an access counter associated with the first entry that counts accesses of the memory page; or
if the cache memory does not include the first entry, then:
initializing a second entry in the cache memory to correspond to the memory page;
comparing the access counter associated with the first entry to a threshold value; and
indicating that the access counter is equal to the threshold value, wherein the threshold value is based on a quantity of accesses that identifies the memory page as a candidate for migration to a memory system that is associated with the first processor, wherein indicating that the access counter is equal to the threshold value comprises causing a trap condition, and wherein either the first processor or the second processor identifies the memory page as a candidate for migration to a memory system that is associated with the first processor in response to the trap condition.

16. A memory subsystem, comprising:
an access tracking mechanism configured to track memory page accesses in a unified virtual memory system by:
based on determining that a set of memory pages is accessed by a first processor and a second processor, barring the set of memory pages from being tracked by access counters;
detecting a memory page access generated by the first processor for accessing a memory page, wherein the memory page resides in a memory system that is associated with the second processor;
determining that the memory page is not included in the set of memory pages that are barred from being tracked by the access counters;
determining whether a cache memory associated with the first processor includes a first entry corresponding to an address associated with the memory page; and
if the cache memory includes the first entry, then:
incrementing an access counter associated with the first entry that counts accesses of the memory page; or
if the cache memory does not include the first entry, then:
initializing a second entry in the cache memory to correspond to the memory page.

17. The memory subsystem of claim 16, wherein initializing a second entry in the cache memory to correspond to the memory page comprises:
determining whether an unused entry in the cache memory is available for allocation; and
if an unused entry in the cache memory is available for allocation; then
assigning the unused entry as the second entry;
associating the second entry with the memory page; and
setting an access counter associated with the second entry to an initial value; or
if an unused in the cache memory is not available for allocation; then
selecting a valid entry in the cache memory;
assigning the valid entry as the second entry;
clearing a valid bit included in the second entry;
associating the second entry with the memory page; and
setting an access counter associated with the second entry to an initial value.

18. The memory subsystem of claim 17, wherein the access tracking mechanism is further configured to determine whether a valid bit included in the second entry has been cleared.

19. The memory subsystem of claim 17, wherein the access tracking mechanism is further configured to associate the second entry with the memory page by:

storing a page number associated with the memory page in the second entry; and setting a valid bit included in the second entry.

20. A computing device, comprising:
a first processor;
a second processor; and
an access tracking mechanism configured to:
  based on determining that a set of memory pages is accessed by the first processor and the second processor, bar the set of memory pages from being tracked by access counters;
  detect a memory page access generated by the first processor for accessing a memory page, wherein the memory page resides in a memory system that is associated with the second processor;
  determine that the memory page is not included in the set of memory pages that are barred from being tracked by the access counters;
  determine whether a cache memory associated with the first processor includes a first entry corresponding to an address associated with the memory page; and
  if the cache memory includes the first entry, then:
    increment an access counter associated with the first entry that counts accesses of the memory page; or
  if the cache memory does not include the first entry, then:
    initializing a second entry in the cache memory to correspond to the memory page.

* * * * *